US009414286B1

(12) United States Patent
Oroskar et al.

(10) Patent No.: US 9,414,286 B1
(45) Date of Patent: Aug. 9, 2016

(54) MANAGEMENT OF HANDOVER IN A COMMUNICATIONS SYSTEM

(71) Applicant: Sprint Spectrum L.P., Overland Park, KS (US)

(72) Inventors: Siddharth S. Oroskar, Overland Park, KS (US); Sreekar Marupaduga, Overland Park, KS (US); Ryan P. Dreiling, Lenexa, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/739,741

(22) Filed: Jun. 15, 2015

(51) Int. Cl.
*H04W 36/24* (2009.01)
*H04W 72/08* (2009.01)
*H04W 36/00* (2009.01)

(52) U.S. Cl.
CPC .......... *H04W 36/24* (2013.01); *H04W 36/0083* (2013.01); *H04W 72/082* (2013.01)

(58) Field of Classification Search
CPC .. H04B 7/0626; H04B 7/0632; H04B 17/318; H04B 17/309; H04B 17/336; H04L 1/0026; H04L 27/2613; H04L 5/0085; H04L 5/0057; H04L 5/0035; H04L 1/0003; H04L 5/0007; H04L 5/0048; H04L 2001/0097; H04L 5/0032; H04L 27/2601; H04L 5/0044; H04W 72/0413; H04W 36/00; H04W 36/0072; H04W 48/08; H04W 24/10; H04W 88/08; H04W 72/042; H04W 72/1242; H04W 28/06; H04W 72/0453; H04J 11/0023; H04J 13/18
See application file for complete search history.

(56) References Cited

U.S. PATENT DOCUMENTS

| 8,358,624 | B1 * | 1/2013 | Ghaus | H04W 36/0061 370/331 |
| 2010/0304748 | A1 * | 12/2010 | Henttonen | H04W 36/0077 455/436 |
| 2012/0087430 | A1 * | 4/2012 | Forenza | H04B 7/024 375/267 |
| 2013/0051322 | A1 * | 2/2013 | Barbieri | H04W 72/082 370/328 |
| 2014/0105150 | A1 * | 4/2014 | Kim | H04B 7/0417 370/329 |

(Continued)

FOREIGN PATENT DOCUMENTS

WO   WO 2011/099906 A1   8/2011

OTHER PUBLICATIONS

Co-Pending U.S. Appl. No. 14/160,145, filed Jan. 21, 2014 "Use of Control Information to Manage Selection of Serving Coverage System".

(Continued)

*Primary Examiner* — Nizar Sivji (57) ABSTRACT

According to aspects of the present disclosure, a method and system are provided for managing handover. In accordance with the disclosure, while a source base station serves a UE, the source base station receives from the UE a measurement report providing an indication of a plurality of candidate target base stations having coverage detected by the UE. Responsive to the report, a CSI reporting rate is determined for each of the candidate targets on a per base station basis. A channel coherence is also determined for the UE. The communication system then selects a target base station from the plurality of candidate targets based on (i) the determined channel coherence and (ii) the determined CSI reporting rates, and the source base station then triggers handover of the UE from the source base station to the selected target base station.

20 Claims, 3 Drawing Sheets

(56) References Cited

U.S. PATENT DOCUMENTS

2014/0179334 A1    6/2014   Forenza et al.
2014/0378144 A1*  12/2014   Legg ..................... H04W 36/30
                                                          455/437

OTHER PUBLICATIONS

Co-Pending U.S. Appl. No. 14/163,485, filed Jan. 24, 2014 "Managing Calls Based on Resource Allocation".

Co-Pending U.S. Appl. No. 14/246,769, filed Apr. 7, 2014 "Dynamic Configuration of Base Station Settings for Controlling Handover to Preferred Coverage Frequency".

Co-Pending U.S. Appl. No. 14/497,818, filed Sep. 26, 2014 "Substitution of System Parameter Information From Other base Station in Response to Error Condition".

Co-Pending U.S. Appl. No. 14/517,465, filed Oct. 17, 2014 "Method and System for Handover with Pre-Configuration of Timing Advance".

* cited by examiner

MANAGEMENT OF HANDOVER IN A COMMUNICATIONS SYSTEM

BACKGROUND

Unless otherwise indicated herein, the description in this section is not itself prior art to the claims and is not admitted to be prior art by inclusion in this section.

A typical wireless communication system includes one or more base stations, each radiating to define one or more coverage areas, such as cells and cell sectors, in which user equipment devices (UEs) such as cell phones, tablet computers, tracking devices, embedded wireless modules, and other wirelessly equipped communication devices, can operate. Further, each base station of the system may then be coupled or communicatively linked with network infrastructure such as a switch or gateway that provides connectivity with one or more transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

In practice, physical base station equipment in such a system may be configured to provide multiple coverage areas, differentiated from each other by direction, carrier frequency, or the like. For simplicity in this description, however, each coverage area may be considered to correspond with a respective base station and each base station may be considered to correspond with a respective coverage area. Thus, an arrangement where physical base station equipment provides multiple coverage areas could be considered to effectively include multiple base stations, each providing a respective one of those coverage areas.

In general, a wireless communication system may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communication (GSM), WI-FI, and BLUETOOTH. Each protocol may define its own procedures for registration of UEs, initiation of communications, handover between coverage areas, and functions related to air interface communication.

In accordance with the air interface protocol, each of the one or more coverage areas of such a system may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define a downlink control channel for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a wireless communication system (e.g., powers on in coverage of the system), the UE may detect the reference signal and read system information broadcast from a base station and may engage in a process to register itself to be served by the base station and generally by the system. For instance, the UE may transmit an attach message on an uplink control channel to the base station, and the base station and/or supporting infrastructure may then responsively authenticate and authorize the UE for service, establish a record indicating where in the system the UE is operating, establish local profile or context records for the UE, and provide an attach accept message to the UE.

When a UE is served in a particular base station coverage area, the UE may also regularly monitor the reference signal strength in that coverage area and in other coverage areas of the system, in an effort to ensure that the UE operates in the best (e.g., strongest) coverage area. If the UE detects threshold weak coverage from its serving coverage area and sufficiently strong coverage from another coverage area, the UE may then engage in a handover process by which the UE transitions to be served by the other coverage area. In the idle mode, the UE may do this autonomously and might re-register in the new coverage area. Whereas, in the connected/active mode, the UE may report signal strengths to its serving base station when certain thresholds are met, and the base station and/or supporting infrastructure may work to hand the UE over to another coverage area. By convention, a UE is said to hand over from a "source" coverage area or base station to a "target" coverage area or base station.

OVERVIEW

In normal practice, when a UE is within coverage of multiple candidate target coverage areas, the UE or the source base station may be configured to select one of the candidate target coverage areas for handover by determining which candidate target coverage area provides the strongest reference signal. A problem with this normal procedure, however, is that the coverage area that provides the strongest reference signal may not be the best coverage area for a particular UE from the network's perspective. Indeed, multiple coverage areas providing sufficiently strong, but different, signal strengths may differ in other ways that may make one coverage area better suited for serving a particular UE than another coverage area.

Existing handover techniques fail to take into account how changing channel conditions for a particular UE may impact network efficiency once the handover is completed. A UE's channel conditions may change for a variety of reasons such as, for example, due to channel fading or multipath. To determine the channel conditions for a UE, the serving base station may employ a channel state feedback reporting procedure. For instance, in an LTE system, the UE periodically reports to the base station channel state information (CSI), which includes, among other things, a channel quality indicator (CQI) that takes into account factors such as signal-to-noise ratio, antenna configuration, UE receiver type, and so forth. The UE determines the CSI based, at least in part, on downlink transmissions and the UE reports the CSI to the base station using uplink channels at regular intervals specified by the base station (i.e., according to a specified "CSI reporting rate"). The base station then allocates resources and determines a modulation and coding scheme (MCS) level for communication with a particular UE on the basis of the CSI reports received from the UE. It is thus beneficial for the base station to have accurate and up-to-date information of the prevailing channel conditions for a UE so that the base station can make appropriate decisions as to resource allocation and MCS.

Notably, however, the rate at which channel conditions change for one UE may be different than the rate at which channel conditions change for another UE, and the CSI reporting rate specified by one base station may be different than the CSI reporting rate specified by another base station. A problem is thus presented if the rate at which channel conditions change for a particular UE does not sufficiently correspond to the CSI reporting rate specified by the UE's serving base station. For example, if the channel conditions for the UE change substantially faster than the CSI reports are received by the base station (i.e., the CSI reporting rate is too low), then the base station may not have sufficiently accurate information to make appropriate MCS and resource allocation decisions.

One approach would be to require the UEs in coverage of a base station to provide CSI reports to the base station as frequently as possible (e.g., in LTE, every 2 ms). Unfortunately, however, this reporting arrangement can give rise to another problem because the shorter the interval between CSI reports, the more significant the uplink signaling overhead becomes for reporting CSI per served UE. Thus, if a base station required a UE to provide CSI reports as frequently as possible, it would be likely that the UE's channel conditions would change substantially slower than the CSI reports were received by the base station, and the extent of uplink resources utilized by the UE thus would be disproportionate to the benefits of such frequent CSI reporting (i.e., the CSI reporting rate would be too high). Further, because there is only a limited extent of air interface resources that can be utilized for serving UEs, such reporting arrangement may unduly limit the number of UEs that could be served by a base station.

Consequently, it would be desirable to manage handover such that a UE operates in a coverage area having a CSI reporting rate that is commensurate with the UE's propensity for channel condition changes. Disclosed herein is a method and system for doing so based, at least in part, on a consideration of (i) the CSI reporting rate of multiple candidate target base stations and (ii) a measure of how often a particular UE's channel conditions have been changing ("channel coherence"). In particular, the disclosure provides for identifying multiple candidate targets for potential handover, determining the CSI reporting rates of the multiple candidate targets on a per candidate target basis, determining a UE's channel coherence, and then selecting a target from the candidate targets based on the determined channel coherence and the determined CSI reporting rates.

According to some aspects, if the UE's channel coherence indicates that the UE's channel conditions have been changing relatively often, then the network can select a handover target with a relatively high CSI reporting rate to allow for relatively frequent CSI reports. Whereas, if the UE's channel coherence indicates that the UE's channel conditions have been changing relatively less often, then the network can select a handover target with a relatively low CSI reporting rate, which would allow for relatively infrequent CSI reports. By handing the UE over to a coverage area having a CSI reporting rate that is commensurate with the UE's channel coherence, the network can receive sufficiently accurate channel condition information without excessive uplink signaling overhead. Accordingly, the present disclosure provides for systems and methods that can select a handover target from a plurality of candidate targets to hand over a UE to a coverage area that provides an efficient usage of network resources.

In one respect, disclosed is a method operable by a communication system to manage a handover of a UE from a source base station to a target base station. In accordance with the method, the source base station serves the UE via an air interface extending between the source base station and the UE. Further, while serving the UE, the source base station receives from the UE a measurement report providing an indication of a plurality of candidate target base stations having coverage detected by the UE. Responsive to the source base station receiving the measurement report, the method includes determining a respective CSI reporting rate for each of the candidate target base stations. At least one of the determined CSI reporting rates is different than another one of the determined CSI reporting rates. The method also includes determining a channel coherence for the UE. The communication system then selects a target base station from the plurality of candidate target base stations based on (i) the determined channel coherence and (ii) the determined CSI reporting rates. The source base station then triggers handover of the UE from the source base station to the selected target base station.

In another respect, disclosed is a base station that includes an antenna structure for communicating over an air interface with a UE, and a controller configured to manage communication via the antenna structure over the air interface. The controller is configured to (i) serve the UE via the air interface, (ii) while serving the UE, receive from the UE a measurement report indicating a plurality of candidate target base stations having coverage detected by the UE, (iii) responsive to receipt of the measurement report, determine a respective CSI reporting rate for each of the candidate target base stations, where at least one of the determined CSI reporting rates is different than another one of the determined CSI reporting rates, (vi) determine a channel coherence for the UE, (v) select a target base station from the plurality of candidate target base stations based on the determined channel coherence and the determined CSI reporting rates, and (vi) trigger handover of the UE to the selected target base station.

Still further, in another respect, disclosed is a method operable by a communication system to manage a handover of a UE from a source base station to a target base station. In accordance with the method, the source base station serves the UE via an air interface extending between the source base station and the UE. Further, while serving the UE, the source base station receives from the UE a measurement report providing an indication of one or more second base stations having coverage detected by the UE. Based at least in part on the received measurement report, the communication system determines that there is more than one candidate target base station for potential handover. The more than one candidate target base station includes at least one of the one or more second base stations. Responsive to the determination that there is more than one candidate target base station, the communication system determines a respective CSI reporting rate for each of the candidate target base stations. At least one of the determined CSI reporting rates is different than another one of the determined CSI reporting rates. The communication system also determines a channel coherence for the UE. The communication system then selects a target base station from the plurality of candidate target base stations based on (i) the determined channel coherence and (ii) the determined CSI reporting rates. The source base station then triggers handover of the UE from the source base station to the selected target base station.

In addition, features of the disclosure could be provided by a non-transitory computer-readable medium, such as a magnetic, optical, or flash storage mechanism, having encoded thereon instructions executable by a controller to cause the controller to carry out operations such as those noted above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
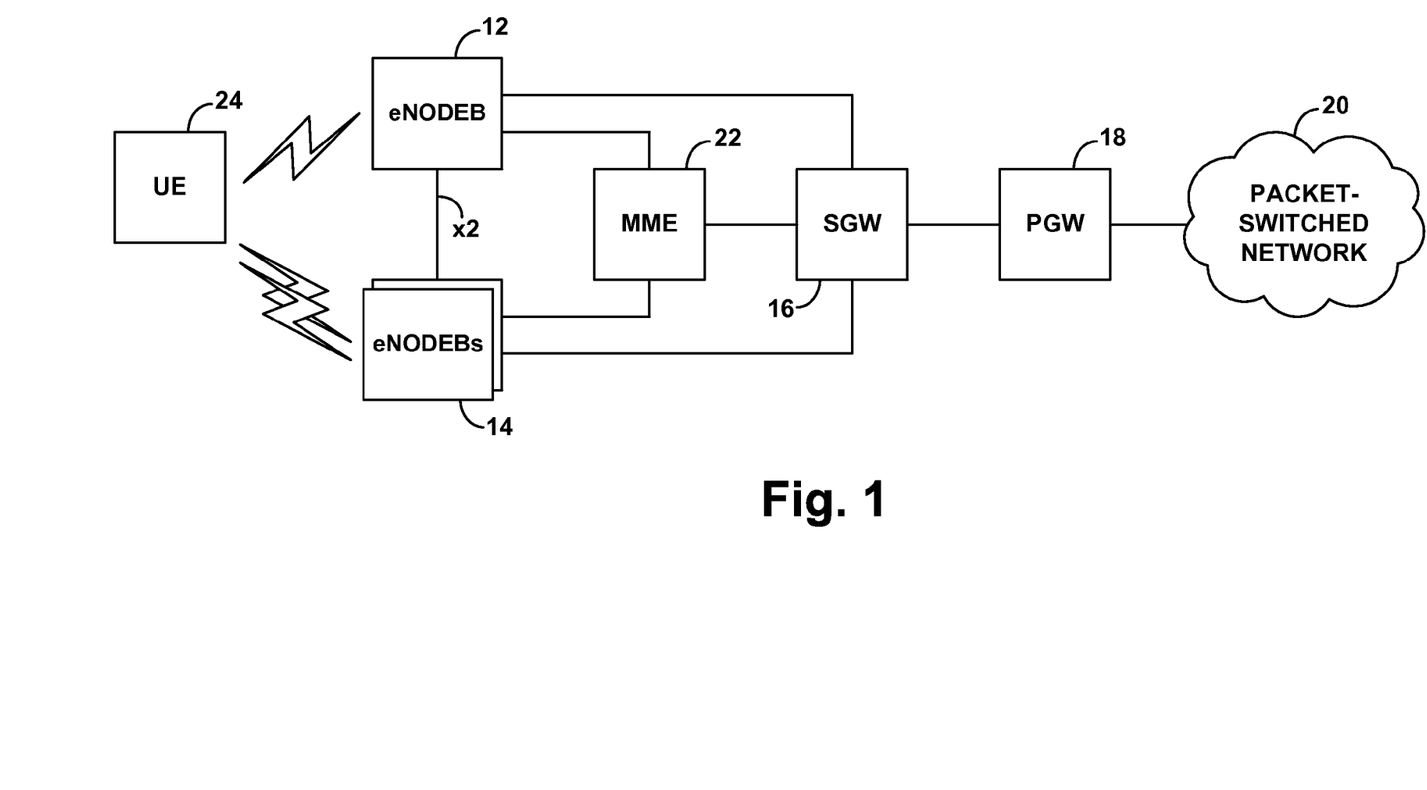
FIG. 1 is a simplified block diagram of a wireless communication system in which the present method and system can be implemented.

FIG. 1 is a simplified block diagram of an example LTE network in which the disclosed features can be implemented. In the LTE network, each base station is referred to as an evolved Node-B or eNodeB. As shown in FIG. 1, the example network includes a first eNodeB 12 and a plurality of second eNodeBs 14, with each eNodeB 12, 14 radiating to provide a respective coverage area (e.g., LTE cell). The various eNodeBs 12, 14 are then shown by way of example having communication interfaces with a serving gateway (SGW) 16, which in turn has a communication interface with a packet-data network gateway (PGW) 18 that provides connectivity with a packet-switched network 20 such as the Internet. Further, the eNodeBs 12, 14 are also shown having communication interfaces with a mobility management entity (MME) 22, which in turn has a communication interface with the SGW 16. In practice, each of these entities may sit as a node on a packet-switched network operated by a wireless service provider, and thus the illustrated interfaces between the entities may be logical connections across that network.

Shown positioned within coverage of the various eNodeBs 12, 14 is a representative UE 24. For the sake of discussion, we can assume that UE 24 is attached with eNodeB 12 and is thus being served with wireless communication service by eNodeB 12. As such, we may assume that the UE 24 has worked with eNodeB 12 to establish a Radio Resource Control (RRC) connection defining a radio-link-layer connection between the UE 24 and the eNodeB 12, and that at least one logical bearer has been established between the UE 24 and the PGW 18, with the bearer including a radio portion extending between the UE 24 and the eNodeB 12 and an access portion extending between the eNodeB 12 and the PGW 18 via the SGW 16. Further, we may assume that, as the UE 24 is served by eNodeB 12, the UE 24 regularly monitors a downlink reference signal from eNodeB 12 and from each eNodeB 14 that the UE 24 can detect.

In accordance with a recent version of LTE, the air interface on both the downlink and the uplink, between the UE 24 and the eNodeB 12, may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10 millisecond frames, with each frame being further divided into ten 1 millisecond subframes or transmission time intervals (TTIs) that are in turn divided into two 0.5 millisecond segments. In each 0.5 millisecond time segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus each supporting transmission of 12 orthogonal frequency division multiplex (OFDM) symbols in respective "resource elements." Thus, the eNodeB 12 and the served UE 24 may transmit symbols to each other in these resource elements, particularly on subcarriers that are spaced apart from each other by 15 kHz and in time segments spanning 67 μs each.

Depending on the bandwidth of the coverage area, the air interface will thus have a particular limited extent of resources (e.g., resource blocks and resource elements) that the eNodeB 12 can allocate per unit time, such as per subframe. In practice, the eNodeB 12 may manage this allocation in accordance with the UE's 24 channel quality. For example, the UE 24 and eNodeB 12 may use a particular level of MCS selected based on the UE's 24 channel quality, with each level of MCS supporting a corresponding data rate. For instance, when the UE's 24 channel quality is poor, the eNodeB 12 and UE 24 may use a low-order MCS such as Quadrature Phase Shift Keying (QPSK), in which each symbol represents just 2 coded data bits. Whereas, if the UE's 24 channel quality is medium, the eNodeB 12 and UE 24 may use a mid-order MCS such as 16 Quadrature Amplitude Modulation (16QAM), in which each symbol represents 4 coded data bits. And if the UE's 24 channel quality is high, the eNodeB 12 and UE 24 may use a high-order MCS such as 64QAM, in which each symbol represents 6 coded data bits. Further gradations of MCS and coding rate are possible as well.

In practice, the UE 24 may periodically determine its channel quality based on downlink air interface quality (e.g., downlink reference signal strength) and perhaps one or more other factors (e.g., UE's 24 capabilities), and the UE 24 may periodically transmit to the eNodeB 12 a CSI report including a CQI that indicates the UE's 24 determined channel quality. Using a standard CQI-MCS mapping table that maps CQI to MCS, the eNodeB 12 may then determine from the reported CQI which MCS to use for communication with the UE 24, and the eNodeB 12 may allocate air interface resources accordingly. As noted above, the UE 24 transmits the CSI report to the eNodeB 12 according to a CSI reporting rate specified by the eNodeB 12. Each of the eNodeBs 14 may also specify a CSI reporting rate for its served UEs, and the CSI reporting rate specified by at least one eNodeB 14 may be different than the CSI reporting rate specified by another eNodeB 14.

Each eNodeB 12, 14 may specify its CSI reporting rate in one or more operational parameters provided to its served UEs to facilitate operation of such UEs in its coverage area. For example, an eNodeB may be set to provide operational parameters to served UEs in a broadcast message, such as a system parameter message or system information block (e.g., a LTE System Block #8 (SIB8) information) that the eNodeB broadcasts generally for served UEs to receive. As another example, an eNodeB may provide operational parameters to served UEs in control messages transmitted specifically to the individual UEs, such as in RRC messages for instance. Such RRC messages could be provided on an as-needed basis, such as when assisting with setup of a communication with or for the UE for instance. The UEs in the network (e.g., the UE 24) may thus be configured to monitor for communications from its serving eNodeB (e.g., the eNodeB 12) to read broadcast and/or control messages so as to receive and then operate in accordance with the specified operational parameters, including the specified CSI reporting rate.

In line with the discussion above, the UE 24 is also configured to regularly receive and evaluate the reference signal broadcast by its serving eNodeB 12 and perhaps reference signals broadcast by other eNodeBs (e.g., the eNodeBs 14), in order to evaluate coverage and facilitate possible handover. For example, the UE 24 may be configured to measure the received reference signal to determine a reference signal receive power (RSRP) and/or a reference signal receive quality (RSRQ), such as signal-to-noise ratio of the reference signal, but for simplicity here any such measurements may be considered to fall under the general umbrella of reference signal strength, coverage strength, or the like.

When the UE 24 detects sufficiently strong coverage from one or more eNodeBs 14, such as coverage sufficiently stronger than that of serving eNodeB 12 (e.g., based on one or more handover thresholds specified by operational parameters), the UE 24 may transmit a measurement report to the serving eNodeB 12 to trigger possible handover. The serving eNodeB 12 (i.e., the "source" eNodeB 12) may then evaluate the reported signal strengths of the one or more eNodeBs 14 indicated by the measurement report (i.e., the "candidate target" eNodeBs 14) and select a target eNodeB from the candidate target eNodeBs 14. Once the target is selected, the source eNodeB 12 may transmit a handover request via an inter-eNodeB "X2" interface to the target eNodeB to prepare the target eNodeB to receive handover of the UE 24. Upon preparing for handover of the UE 24, the target eNodeB may then transmit to the source eNodeB 12 a handover request acknowledge message that carries information including an identifier (e.g., a cell radio network temporary identifier (C-RNTI)) for use by the UE 24 to engage in communication with the target eNodeB. The source eNodeB 12 may then transmit that information to the UE 24 in an RRC Connection Reconfiguration message that essentially functions as a handover directive to cause the UE 24 to hand over to the target eNodeB.

As noted above, the present disclosure provides for selection of a handover target in the event that multiple candidate targets are identified. In particular, the disclosure provides for handover of a UE by selecting a target eNodeB from a plurality of candidate target eNodeBs 14 based, at least in part, on a consideration of (i) the various CSI reporting rates of the candidate target eNodeBs 14 and (ii) a measure of how often the UE's 24 channel conditions have been changing (i.e., the UE's channel coherence). The disclosure then provides for handing over the UE 24 to the selected target eNodeB.

This process can be carried out by the source eNodeB 12 itself and/or by one or more other network entities, such as with portions of the target selection analysis carried out by an entity outside of the eNodeB 12 (e.g., the MME 22 or the UE 24) and the eNodeB 12 then responsively handing over the UE 24 according to the analysis. For simplicity, however, the process will be described here in a scenario where the source eNodeB 12 carries out all aspects of the process.

In the illustrated example, the process may begin in a scenario where, while the eNodeB 12 is serving the UE 24, the eNodeB 12 receives from the UE 24 a measurement report indicating that the UE 24 detected threshold strong coverage from more than one of the eNodeBs 14. Based on the received measurement report, the eNodeB 12 can determine that the eNodeBs 14 indicated in the report comprise multiple candidate targets for possible handover. Upon determining that there are multiple candidate targets, the source eNodeB 12 may then determine the channel coherence for the UE 24 and the CSI reporting rates for each candidate target, on a per candidate target basis, to facilitate selection of a target from the candidate targets.

The eNodeB 12 can determine the channel coherence of the UE 24, for example, from CSI reports previously provided by the UE 24 to the source eNodeB 12. As noted above, the CSI reports include information (e.g., CQI) that can be utilized by the source eNodeB 12 to determine a metric indicative of how frequently the channel conditions have changed for the UE 24 over a given period of time. In practice, the eNodeB 12 can determine variations in CQI from the UE's 24 prior CSI reports and then determine a rate of variation of the UE's channel conditions based on the determined variations in CQI. Accordingly, the eNodeB 12 may be configured to process CSI reports and store the relevant information in a memory for each UE it serves, on a per UE basis, to facilitate determinations of UE channel coherence. In particular, the eNodeB 12 can store a determined channel coherence for each UE and/or the eNodeB 12 can store data that can be later used to determine the channel coherence for each UE (e.g., after the handover process has been initiated).

According to additional or alternative aspects, the eNodeB 12 can determine and store the UE's 24 channel coherence in the memory in advance of the handover process for the UE 24.

Additionally, for example, the eNodeB 12 may from time to time evaluate uplink air interface quality (e.g., by receiving and processing a sounding reference signal (SRS) provided by the UE 24) as a basis to determine the UE's 24 channel condition while serving the UE 24. In such instances, the eNodeB 12 may additionally or alternatively determine the channel coherence of the UE 24 based on stored data relating to prior determinations of the UE's 24 channel conditions and/or prior determinations of a rate of variation of the UE's channel conditions for the uplink air interface. Thus, according to aspects of the present disclosure, the channel coherence can be based on channel condition information previously determined for the downlink, the uplink, or combinations thereof for a particular UE.

It should be understood that the eNodeB 12 can determine the UE's 24 channel coherence in other ways as well. For instance, according to additional or alternative aspects, the UE 24 can report its channel coherence to the eNodeB 12.

As noted above, at least one of the candidate target eNodeBs 14 may have a different CSI reporting rate than another candidate target eNodeB 14. In accordance with the LTE protocol, each eNodeB 14 may independently specify a CSI reporting rate between 2 ms and 160 ms for its served UEs operating within its coverage. The eNodeB 12 can determine the particular CSI reporting rate employed by each of the candidate target eNodeBs 14 in a variety of ways.

For example, the source eNodeB 12 can store or have access to a neighbor list of eNodeBs 14 and/or coverage areas that are adjacent or in close proximity to the coverage area serving the UE 12 and are thus likely to be candidate targets for a handover. According to aspects of the present disclosure, the neighbor list may indicate, on a per eNodeB basis, a CSI reporting rate for each eNodeB 14 in the neighbor list. According to some aspects, the neighbor list can be provisioned manually with this information by engineering input. According to additional or alternative aspects, to populate the neighbor list with the CSI reporting rate of each eNodeB 14, the eNodeB 12 may periodically request such information from the eNodeBs 14 on the neighbor list via an inter-eNodeB communication interface (e.g., an X2 interface). Each eNodeB 14 may then respond with a message that provides data representing the CSI reporting rate for that eNodeB 14. Thus, according to some aspects of the present disclosure, the reporting rates of the candidate target eNodeBs 14 may be stored in the neighbor list in advance of the handover process for the UE 24.

According to additional or alternative aspects, one or more of the candidate targets indicated in the measurement report, provided by the UE 24 to the source eNodeB 12, may not be included in the neighbor list. In such instances, the eNodeB 12 may request and receive the CSI reporting rate(s) from those candidate target(s) via the inter-eNodeB communication interface on an as-needed basis and, optionally, update the neighbor list to include information received from such candidate targets. According to alternative aspects, instead of accessing the neighbor list to determine the CSI reporting rates, the eNodeB 12 may be programmed to request and receive the CSI reporting rates from some or all candidate targets via the inter-eNodeB communication interface.

Once the source eNodeB 12 determines the channel coherence for the UE 24 and the CSI reporting rate for each of the candidate target eNodeBs 14, the source eNodeB 12 then selects one of the candidate target eNodeBs 14 as the target for carrying out the handover. In particular, the source eNodeB 12 selects, based on the UE's 24 determined channel coherence, the candidate target eNodeB 14 having a CSI reporting rate that is expected to allow the network to receive sufficiently accurate channel condition information for the UE 24 with decreased or minimal uplink signaling overhead. For example, according to some aspects, if the determined channel coherence indicates that the UE's 24 channel conditions have been changing relatively often, then the source eNodeB 12 can select a target eNodeB with a relatively high CSI reporting rate for handover to allow for relatively frequent CSI reports. Whereas, for example, if the determined channel coherence indicates that the UE's 24 channel conditions have been changing relatively less often, then the source eNodeB 12 can select a target eNodeB with a relatively low CSI reporting rate for handover, which would provide relatively infrequent CSI reports. By handing the UE 24 over to a target having a CSI reporting rate that is generally commensurate with the UE's 24 channel coherence, air interface resources can be more appropriately and efficiently utilized based on the specific operating conditions likely to be experienced by the UE 24.

To select the target from the candidate targets, the source eNodeB 12 may compare the determined reporting rates of each candidate target to the determined channel coherence. For example, the source eNodeB 12 may determine which of the candidate targets has a CSI reporting rate that is closest to the determined channel coherence to select the target from the candidate targets. As another example, to select the target, the source eNodeB 12 may determine which of the candidate targets has a CSI reporting rate that is both (i) higher than and (ii) closest to the determined channel coherence. Other examples are also possible. Once the target eNodeB is selected, the source eNodeB 12 can trigger handover of the UE 24 to the selected target eNodeB.

Figure 2:
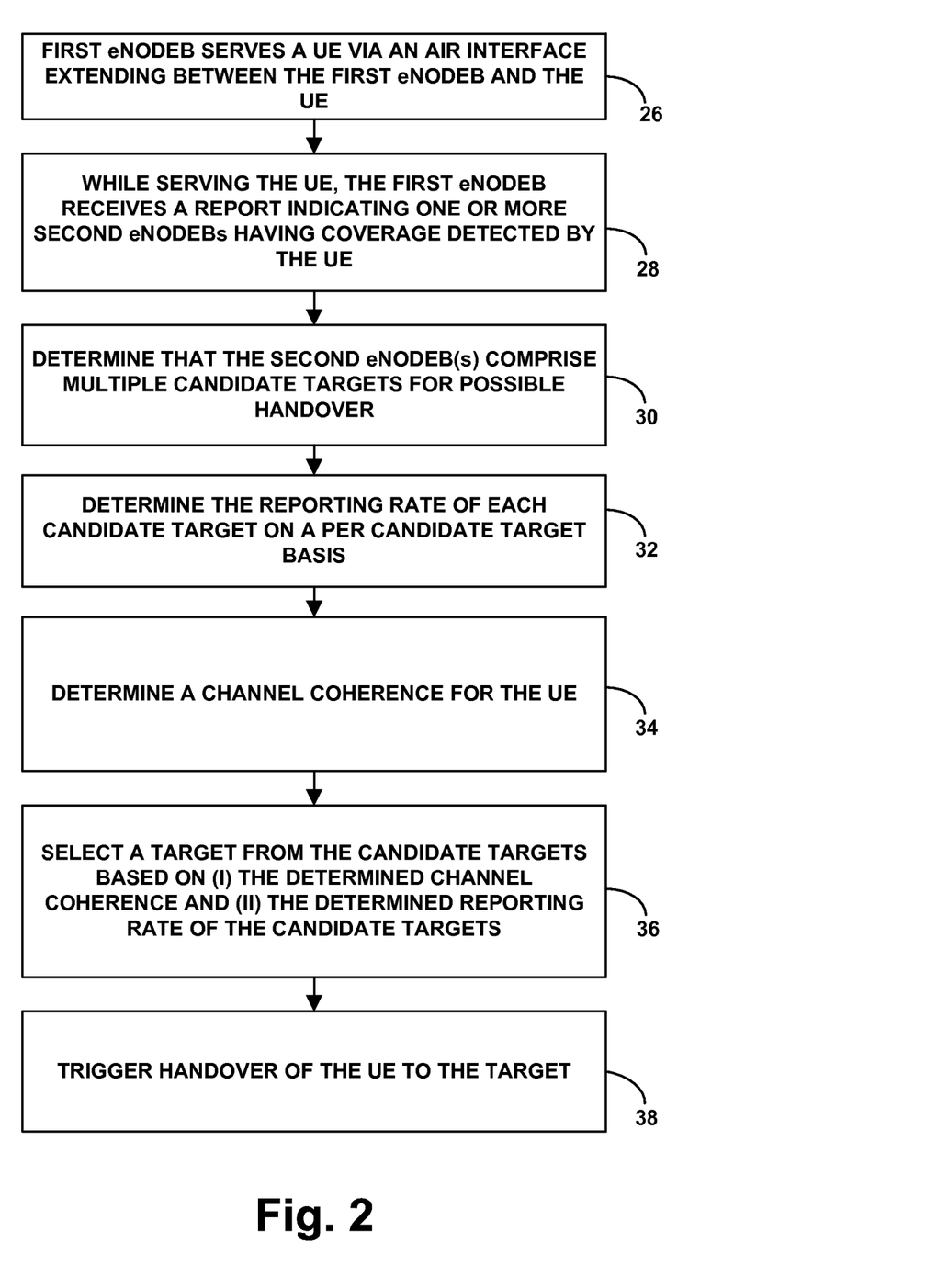
FIG. 2 is a flow chart depicting example operations in accordance with the disclosure.

FIG. 2 is next a flow chart depicting an example set of operations that can be carried out in an implementation of this process. As shown in FIG. 2, at block 26, a first eNodeB (e.g., the eNodeB 12) serves a UE via an air interface extending between the first eNodeB and the UE. At block 28, while thus serving the UE, the first eNodeB receives from the UE a report indicating one or more second eNodeBs having coverage detected by the UE, which may be considered for possible handover. According to some non-limiting examples, the report may indicate that the UE detected sufficiently strong signals (e.g., based on a threshold comparison) from the one or more second eNodeBs. At block 30, responsive to the report, the first eNodeB determines (e.g., based on the reported signal strengths) that the one or more second eNodeBs comprise multiple candidate targets for the possible handover. At block 32, responsive to the determination of multiple candidate targets, the first eNodeB determines a CSI reporting rate for each candidate target on a per candidate target basis.

At block 34, the first eNodeB determines a channel coherence for the UE. According to some aspects, the first eNodeB may determine the channel coherence for the UE at block 34 by retrieving a previously determined channel coherence stored in memory. According to some alternative aspects, the first eNodeB may determine the channel coherence for the UE at block 34 by retrieving information stored in the memory and then processing the retrieved information to calculate a rate of variation of the channel conditions for the UE. At block 36, the first eNodeB selects a target from the candidate targets based on (i) the CSI reporting rates of the candidate targets determined at block 32 and (ii) the channel coherence determined for the UE at block 34. At block 38, the first eNodeB triggers handover of the UE to the selected target eNodeB.

FIG. 2, described by way of example above, represents one process that corresponds to at least some instructions executable by a controller to perform the above described functions according to aspects of the present disclosure. It is also within the scope and spirit of the present disclosure to omit steps, include additional steps, and/or modify the order of steps presented above. For example, according to some alternative aspects of the present disclosure, the process can include an additional step whereby the source eNodeB 12 determines whether there are any other eNodeBs that were not specified in the measurement report but that should be considered as candidate targets for handover. For instance, the eNodeB 12 may access the neighbor list to identify additional candidate target(s) having a CSI reporting rate that would be appropriate for the UE 24 based on the determined channel coherence at block 34, and then the eNodeB 12 may transmit a message to the UE 24 to request a further measurement report providing an indication of signal strength for the identified additional candidate target(s). Upon receiving the further measurement report, the eNodeB 12 may then evaluate the reported signal strengths of the additional candidate target(s) to determine whether they meet handover threshold criteria and, thus, whether the additional candidate target(s) should be further considered for handover target selection.

Figure 3:
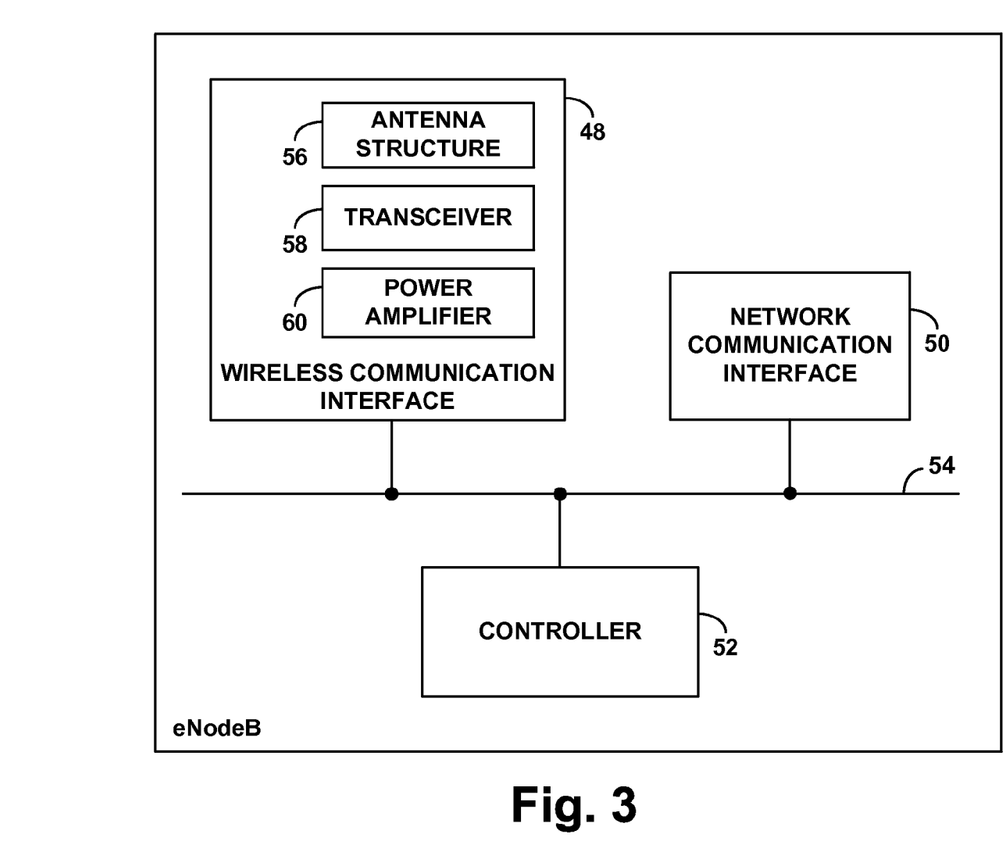
FIG. 3 is a simplified block diagram of an example base station operable in accordance with the disclosure.

FIG. 3 is a simplified block diagram of an example eNodeB (e.g., macro eNodeB, small cell, or other type of base station), showing some of the components that such a device may include in order to carry out these and other operations. As shown, the example eNodeB includes a wireless communication interface 48, a network communication interface 50, and a controller 52, all of which can be integrated together in various ways or, as shown, interconnected with each other through a system bus, network, or other connection mechanism 54.

Wireless communication interface 48 includes an antenna structure (e.g., one or more antennas or antenna elements) 56, which can be tower mounted or provided in some other manner, configured to transmit and receive over the air interface and thereby facilitate communication with served UEs. Further, the wireless communication interface includes a transceiver 58 and power amplifier 60 supporting air interface communication according to the LTE protocol. Network communication interface 50 may then comprise one or more wired and/or wireless network interfaces (such as an Ethernet interface) through which the eNodeB may transmit and receive data over a backhaul connection with other entities, such as X2 communications with other eNodeBs as discussed above.

Controller 52, which may be integrated with wireless communication interface 48, network interface 50, and/or with one or more other components of the eNodeB, may then be configured to manage communication over the air interface and carry out various operations described herein. By way of example, controller 52 may be configured to (i) receive a report from a served UE indicating signal strengths of other eNodeBs, (ii) determine, based on the report, that there are multiple candidate targets for a potential handover of the UE, (iii) determine a channel coherence for the UE, (iv) determine the CSI reporting rate for each of the candidate targets on a per candidate target basis, (v) select a target from the candidate targets based on the determined channel coherence and the determined CSI reporting rates, and/or (vi) facilitate handover of the UE to the selected target eNodeB.

Controller 52 can be implemented using hardware, software, and/or firmware. For example, controller 52 can include one or more processors and a non-transitory computer readable medium (e.g., volatile and/or non-volatile memory) that stores machine language instructions or other executable instructions. The non-transitory computer readable medium can further store, for example, the neighbor list, which may be utilized to facilitate selection of a target from a plurality of candidate targets as described above. The instructions, when executed by the one or more processors, may cause controller 52, and thus the eNodeB, to carry out the various base station operations described herein.

Exemplary embodiments have been described above. Those skilled in the art will understand, however, that changes and modifications may be made to these embodiments without departing from the true scope and spirit of the invention.

What is claimed is:

1. A method of operating a communication system to manage a handover of a user equipment device (UE) from a source base station to a target base station, the method comprising:
    serving, by a source base station, a UE via an air interface extending between the source base station and the UE;
    while serving the UE, the source base station receiving from the UE a measurement report providing an indication of a plurality of candidate target base stations having coverage detected by the UE;
    responsive to the source base station receiving the measurement report, determining a respective periodic channel state information (CSI) reporting rate for each of the candidate target base stations, wherein at least one of the determined CSI reporting rates is different than another one of the determined CSI reporting rates;
    determining a channel coherence for the UE;
    selecting a target base station from the plurality of candidate target base stations based on (i) the determined channel coherence and (ii) the determined CSI reporting rates; and
    triggering handover of the UE from the source base station to the selected target base station.

2. The method of claim 1, wherein the determining the channel coherence comprises determining a rate of variation of a channel condition for the UE based on one or more CSI reports received from the UE.

3. The method of claim 1, wherein the determining the respective CSI reporting rate for each candidate target base station comprises accessing a neighbor list that includes an indication of the CSI reporting rate for one or more of the candidate target base stations on a per base station basis.

4. The method of claim 3, further comprising:
    determining that at least one candidate target base station is not included in the neighbor list and responsively requesting an indication of the CSI reporting rate from each of the at least one candidate target base stations via an inter-base-station communication interface.

5. The method of claim 3, further comprising:
    the source base station periodically receiving from each of the one or more candidate target base stations in the neighbor list, on a per base station basis, the indication of the CSI reporting rate maintained by the candidate target base station; and
    updating the neighbor list based on the received indications of CSI reporting rate.

6. The method of claim 5, wherein the indications of CSI reporting rate are received by the source base station via an inter-base-station communication interface.

7. The method of claim 1, further comprising:
    the source base station identifying at least one additional candidate target base station that is different from the plurality of candidate base stations indicated by the received measurement report; and
    determining a respective CSI reporting rate for each of the at least one additional candidate target base stations,
    wherein the selecting the target base station includes selecting the target base station from the plurality of candidate target base stations or the at least one additional base station based on (i) the determined channel coherence and (ii) the determined CSI reporting rates of the plurality of candidate target base stations and the at least one additional candidate target base station.

8. The method of claim 1, wherein selecting the target base station comprises comparing the determined channel coherence to the determined CSI reporting rate respectively of each candidate target base station.

9. The method of claim 8, wherein the comparing the determined channel coherence to the determined CSI reporting rate respectively of each candidate target base station comprises determining which of the determined CSI reporting rates is both (i) higher than and (ii) closest to the determined channel coherence.

10. A base station comprising:
    an antenna structure for communicating over an air interface with a user equipment (UE); and
    a controller configured to manage communication via the antenna structure over the air interface, wherein the controller is configured to:
    (i) serve the UE via the air interface;
    (ii) while serving the UE, receive from the UE a measurement report indicating a plurality of candidate target base stations having coverage detected by the UE;

(iii) responsive to receipt of the measurement report, determine a respective periodic channel state information (CSI) reporting rate for each of the candidate target base stations, wherein at least one of the determined CSI reporting rates is different than another one of the determined CSI reporting rates;

(iv) determine a channel coherence for the UE;

(v) select a target base station from the plurality of candidate target base stations based on the determined channel coherence and the determined CSI reporting rates; and (vi) trigger handover of the UE to the selected target base station.

11. The base station of claim 10, wherein, to determine the channel coherence, the controller is configured to determine a rate of variation of a channel condition for the UE based on one or more CSI reports received from the UE.

12. The base station of claim 10, further comprising a non-transitory computer readable medium that stores a neighbor list, the neighbor list including an indication of the CSI reporting rate respectively for each candidate target base station, wherein the controller is further configured to access the neighbor list to determine the CSI reporting rate of each candidate target base station.

13. The base station of claim 12, wherein the controller is further configured to:

receive from each candidate target base station, on a per base station basis, the indication of the CSI reporting rate maintained by the candidate target base station; and update the neighbor list based on the received indications of CSI reporting rate.

14. The base station of claim 13, further comprising an inter-base-station communication interface for communicating with the candidate target base stations regarding the indications of CSI reporting rate.

15. The base station of claim 10, wherein, to select the target base station, the controller is further configured to compare the determined channel coherence to the determined CSI reporting rate respectively of each candidate target base station.

16. The base station of claim 15, wherein, to compare the determined channel coherence to the determined CSI reporting rate respectively of each candidate target base station, the controller is further configured to determine which of the determined CSI reporting rates is both (i) higher than and (ii) closest to the determined channel coherence.

17. The base station of claim 10, wherein the base station is an evolved Node-B (eNodeB) in an Orthogonal Frequency Division Multiple Access (OFDMA) network.

18. A method of operating a communication system to manage a handover of a user equipment device (UE) from a first base station to a target base station, the method comprising:

serving, by the first base station, the UE via an air interface extending between the first base station and the UE;

while serving the UE, the first base station receiving from the UE a measurement report providing an indication of one or more second base stations having coverage detected by the UE;

determining, based at least in part on the received measurement report, that there is a plurality of candidate target base stations for possible handover, the plurality of candidate target base stations including at least one second base station;

responsive to the determination that there is the plurality of candidate target base stations, determining a respective periodic channel state information (CSI) reporting rate for each candidate target base station, wherein at least one of the determined CSI reporting rates is different than another one of the determined CSI reporting rates;

determining a channel coherence for the UE;

selecting the target base station from the plurality of candidate target base stations based on (i) the determined channel coherence and (ii) the determined CSI reporting rates; and triggering handover of the UE from the first base station to the selected target base station.

19. The method of claim 18, further comprising the first base station identifying, based on the determined channel coherence, one or more third base stations that are different from the one or more second base stations, the plurality of candidate target base stations including the one or more third base stations and the at least one second base station.

20. The method of claim 18, wherein the plurality of target base stations includes a first candidate target base station having a first CSI reporting rate that is higher than a second CSI reporting rate of a second candidate target base station, and wherein the selecting the target base station comprises:

selecting the first candidate target base station if the determined channel coherence is higher than a first value; and selecting the second candidate target base station if the determined channel coherence is lower than a second value, wherein the first value is higher than the second value.

* * * * *